(12) United States Patent
Mitchell

(10) Patent No.: US 6,720,953 B1
(45) Date of Patent: Apr. 13, 2004

(54) COMPUTER DISPLAY SYSTEM WITH MANUAL FAIL-SAFE BACK-UP

(75) Inventor: Steven W. Mitchell, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 374 days.

(21) Appl. No.: 09/677,436

(22) Filed: Oct. 3, 2000

(51) Int. Cl.[7] .................................................. G09G 5/00
(52) U.S. Cl. ...................................................... 345/173
(58) Field of Search ................................ 345/173, 174, 345/102; 248/285.1

(56) References Cited

U.S. PATENT DOCUMENTS

| | | |
|---|---|---|
| 4,371,870 A | 2/1983 | Biferno |
| 4,949,489 A | 8/1990 | Rudell et al. ................. 40/546 |
| 5,059,960 A | 10/1991 | Rosenberg et al. |
| 5,176,522 A | 1/1993 | Robertson, Jr. ............. 434/415 |
| 5,216,411 A | 6/1993 | Ashitomi et al. |
| 5,353,075 A | 10/1994 | Conner et al. .............. 353/122 |
| 5,499,165 A | 3/1996 | Holmes, Jr. ................... 362/31 |
| 5,736,973 A * | 4/1998 | Godfrey et al. ............. 345/102 |
| 5,774,105 A | 6/1998 | Yamamoto et al. |
| 5,918,396 A | 7/1999 | Jung ........................... 40/546 |
| 5,924,665 A * | 7/1999 | Sweere et al. ............ 248/285.1 |
| 6,088,025 A * | 7/2000 | Akamine et al. ........... 345/175 |
| 6,118,436 A * | 9/2000 | Kushita ....................... 345/173 |
| 6,224,222 B1 | 5/2001 | Inoguchi et al. .............. 362/29 |

FOREIGN PATENT DOCUMENTS

| | | |
|---|---|---|
| EP | 0 618 715 A1 | 10/1994 |
| GB | 2 215 662 A | 9/1989 |
| JP | 08152968 | 6/1996 |

OTHER PUBLICATIONS

A copy of PCT International Search Report for International Application No. PCT/US01/30955 mailed on May 7, 2002 (7 pages).

* cited by examiner

*Primary Examiner*—Matthew Luu
(74) *Attorney, Agent, or Firm*—Dicke, Billig & Czaja

(57) ABSTRACT

A computer display system connectable to a computer system includes a computer-driven display screen displaying information from the computer system. A manual display screen mounted to the computer-driven display screen displays information provided by a human operator. The computer-driven display screen is viewable from a line-of-sight in a first mode of operation, and the manual display screen is viewable from the line-of-sight in a second mode of operation.

19 Claims, 5 Drawing Sheets

COMPUTER DISPLAY SYSTEM WITH MANUAL FAIL-SAFE BACK-UP

GOVERNMENT INTEREST

This invention was made with Government support under Government Contract No. POM-39428-R (IWTA TTM725674) awarded by a Government Agency. The Government has certain rights in this invention.

THE FIELD OF THE INVENTION

The present invention generally relates to computer display systems, and more specifically to a computer display system with manual fail-safe back-up.

BACKGROUND OF THE INVENTION

The United States Navy and foreign navies use manual display panels, referred to as fiddle boards, to maintain current status displays for various operations. Fiddle boards are transparent plastic display panels with an integral light source. The panels are constructed with appropriate light transmitting characteristics, commonly referred to as "light pipes", so that when the light source shines into the panel's edge, light is distributed throughout the panel, and the display is evenly illuminated. Data is written with grease pencils on the back of the panel by human operators writing backwards so that users in front of the fiddle board can read the updated status displays with an unobstructed view.

Computer driven flat-panel display screens are commonly used in other industries to maintain current status displays for similar operations. Data is entered into a computer system and then displayed on the computer-driven display for viewing by end users.

Replacing the current fiddle board systems with computer-driven computer-driven display systems would allow the navy to reduce the manpower required to staff naval decision centers. However, mission critical status displays must have a manual back-up mode to provide fail-safe operation. Current computer-driven flat panel displays have no fail-safe manual back-up mode. If the computer system driving the flat-panel display screen or the flat panel display screen itself fails, the current status display would be lost and the operation placed in jeopardy.

For reasons stated above, and for other reasons presented in greater detail in the Description of the Preferred Embodiments section of the present application, a computer-driven display system is desired which has a manual fail-safe back-up that duplicates the functionality of the current fiddle board display system.

SUMMARY OF THE INVENTION

The present invention provides a computer display system that is coupled to a computer system. The computer display system includes a computer-driven display screen with a housing that displays information from the computer system. A manual display screen is mounted to the housing of the computer-driven display screen and displays information provided by a human operator. The computer-driven display screen is viewable from a line-of-sight in a first mode of operation, and the manual display screen is view from the line-of-sight in a second mode of operation.

In one embodiment, the computer-driven display screen comprises a back-lit flat panel display screen. A transparent polycarbonate plastic manual display screen is mounted to the front of the computer-driven display screen housing.

In one embodiment, the manual display screen includes an integral light source that provides edge lighting to illuminate the manual display screen. Additionally, the computer display system includes a back-up power source capable of supplying power to the integral light source.

In one embodiment, the computer-driven display screen is hinge-mounted to an external supporting surface. Additionally, the manual display screen is hinge-mounted to the computer-driven display screen housing.

In one embodiment, the computer-driven display screen and the manual display screen are rotatable to be substantially perpendicular to the line-of-sight in a first mode of operation. In a second mode of operation, the computer-driven display screen is rotatable to be substantially parallel with the line-of-sight and the manual display screen is rotatable to be substantially perpendicular to the line-of-sight.

In one embodiment, the computer system and the computer-driven display screen are operational in a first mode of operation. In a second mode of operation, the computer system and/or the computer-driven display screen are not operational.

One aspect of the present invention provides a method for displaying information. The method includes displaying information provided from a computer system on a computer-driven display screen that is viewable from a line-of-sight in a first mode of operation. Additionally, the method includes displaying information provided by a human operator on a manual display screen that is viewable from the line-of-sight in a second mode of operation.

The present invention can provide a system for displaying computer-generated information on a computer-driven display screen that has a manual fail-safe back-up that duplicates the functionality of a fiddle board display system.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
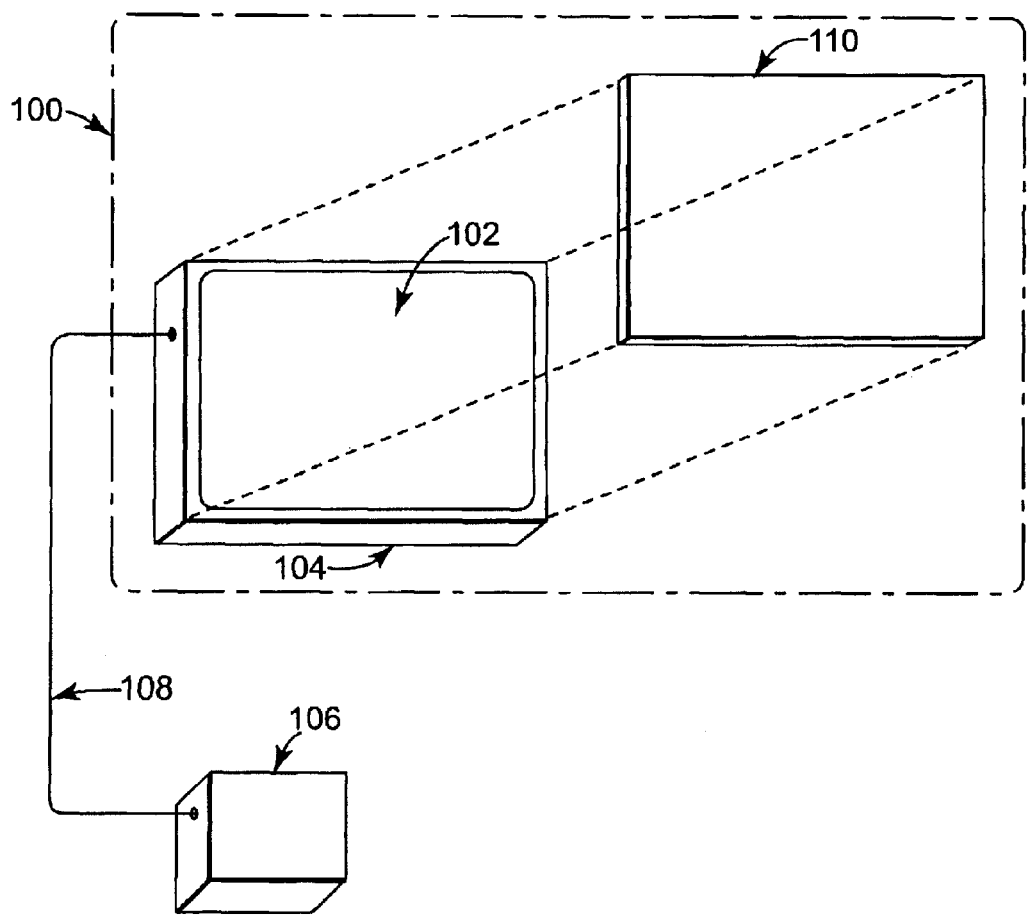
FIG. 1A is an exploded perspective view block diagram of one embodiment of a computer display system with manual fail-safe back-up according to the present invention and a corresponding computer system.
Figure 1B:
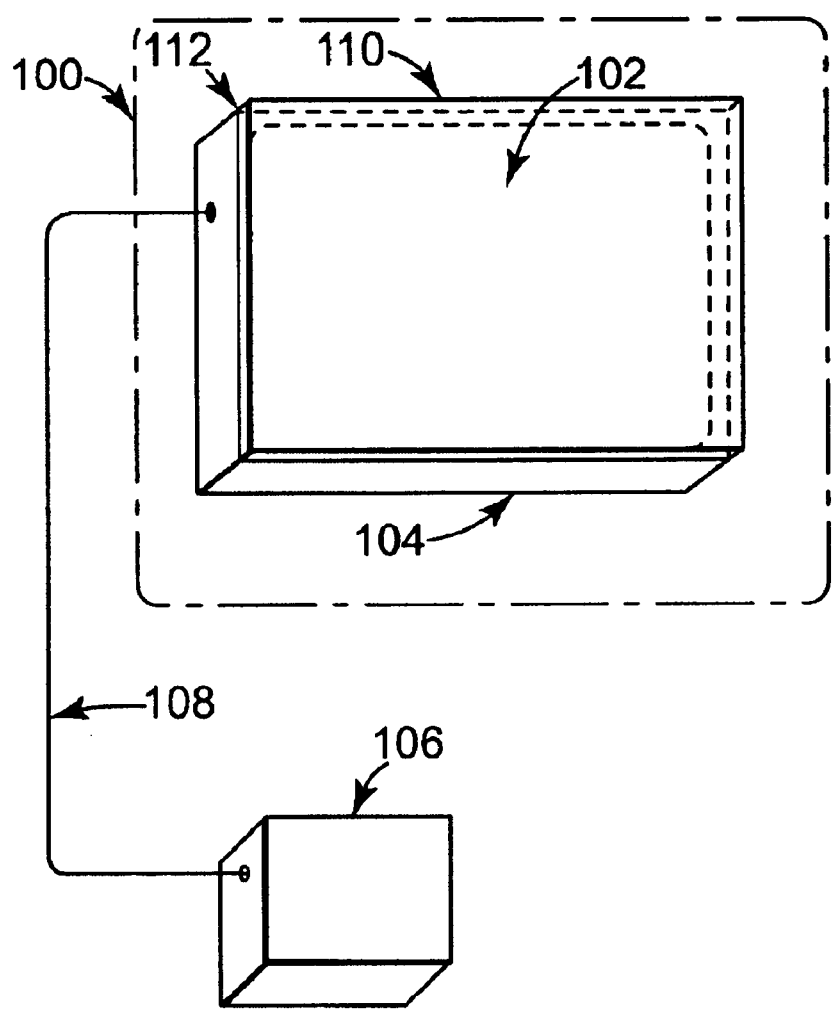
FIG. 1B is a front perspective view block diagram of one embodiment of a computer display system with manual fail-safe back-up according to the present invention and a corresponding computer system.

One embodiment of a computer display system according to the present invention is illustrated generally at 100 in FIGS. 1A and 1B. Computer display system 100 includes a computer-driven flat panel display screen 102, a display screen housing 104, and a transparent polycarbonate manual display screen 110. Computer display system 100 communicates with a computer system 106 via a line 108. Manual display screen 110 can be embodied in embodiments other than transparent polycarbonate such as glass, transparent or translucent plastic with or without light pipe capability, a chalkboard, or a whiteboard. Additionally, computer-driven display screen 102 can be embodied in embodiments other than a flat panel display such as a cathode ray tube (CRT) or a liquid crystal display (LDC) screen.

As illustrated in FIG. 1B, transparent polycarbonate manual display screen 110 is secured to the front of display computer-driven flat display screen housing 104 by mounting means 112. Mounting means 112 can be embodied in any suitable mounting means, such as brackets, hinges, glue, or bolts and nuts. Under normal conditions, computer display system 100 operates in a first mode of operation in which desired information from computer system 106 is transmitted via line 108 and displayed on computer-driven display screen 102. If computer-driven display screen 102 and/or computer system 106 fails, computer display system 100 operates in a second mode of operation in which a human operator manually displays the desired information on transparent polycarbonate manual display screen 110.

Figure 2:
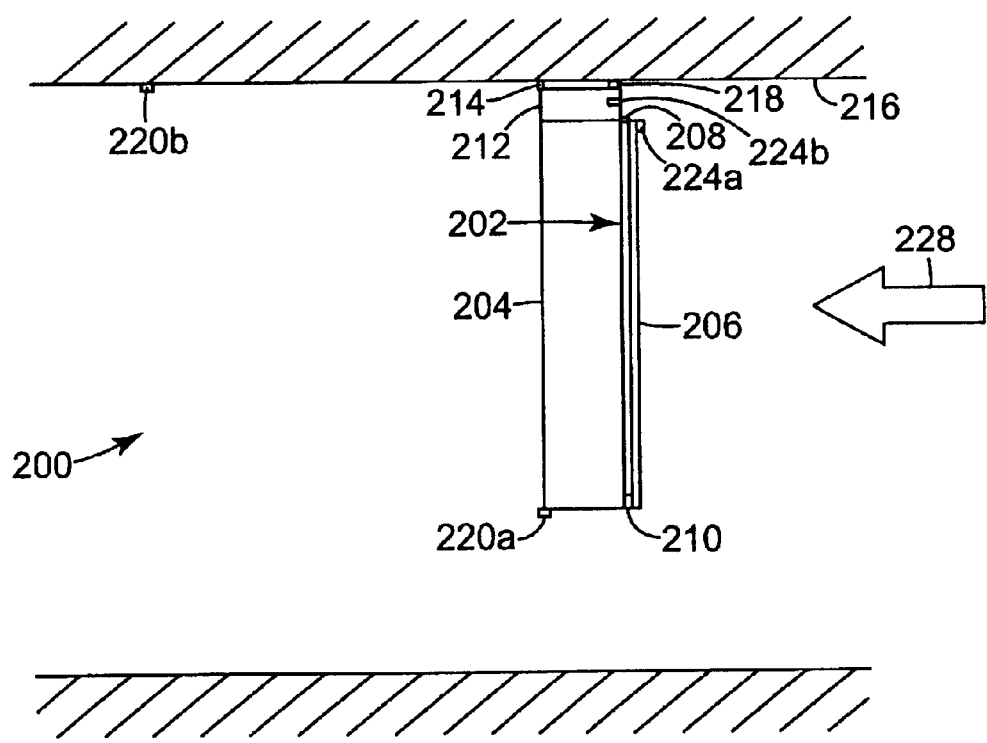
FIG. 2 illustrates one embodiment of a computer display system in a normal mode of operation.
Figure 3:
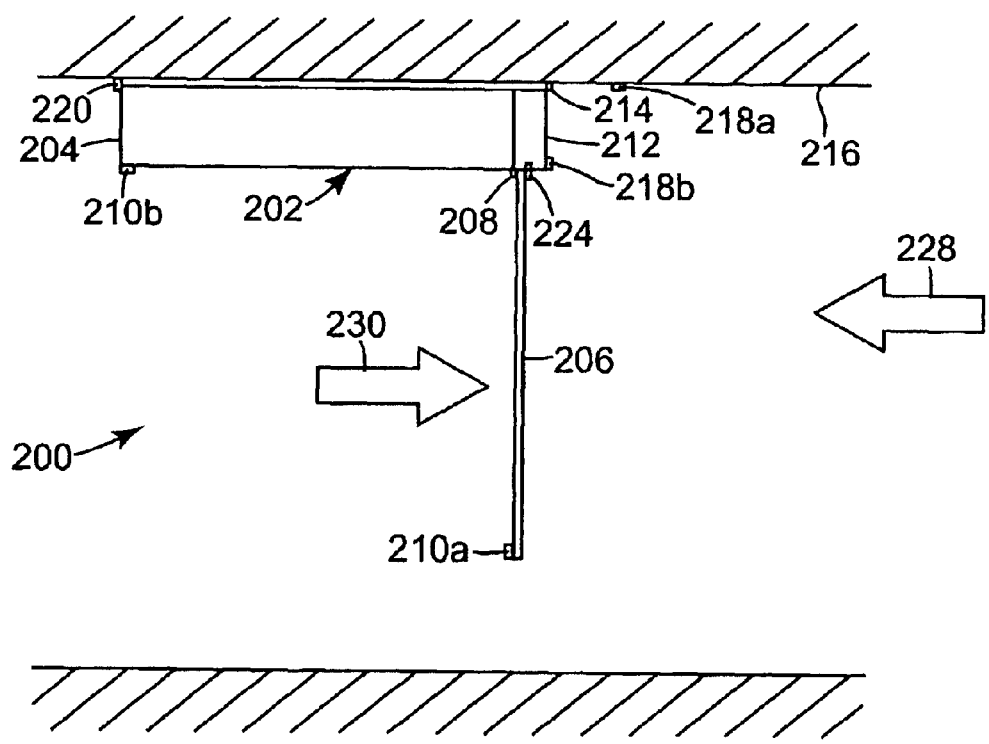
FIG. 3 illustrates the computer display system of FIG. 2 in a manual fail-safe mode of operation.
Figure 4:
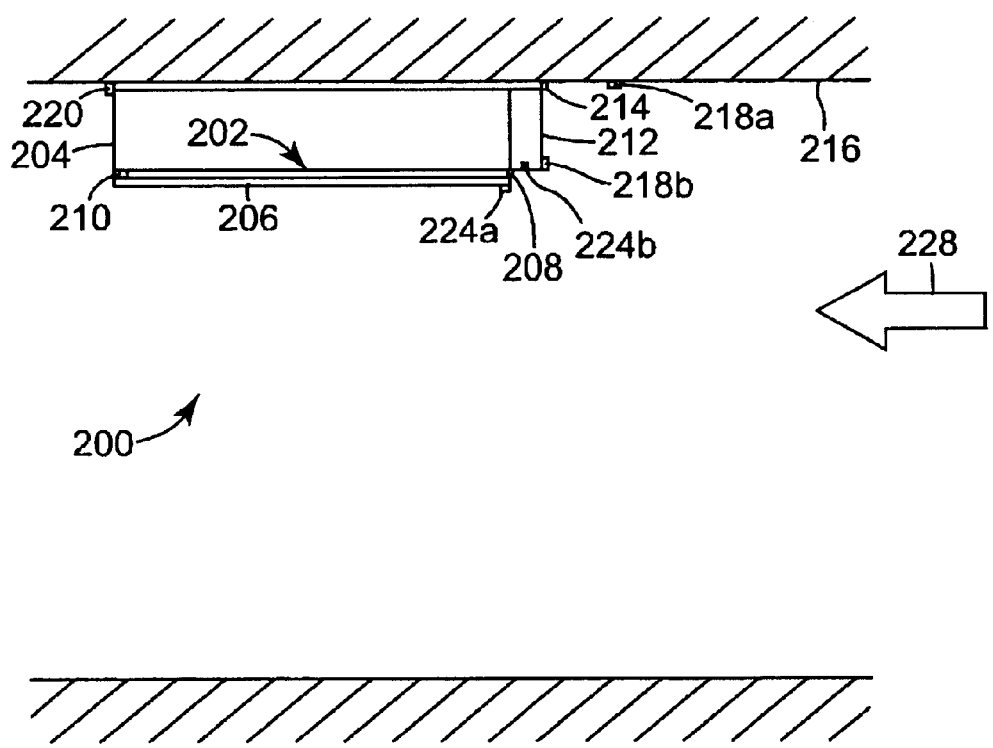
FIG. 4 illustrates the computer display system of FIG. 2 in a stowed mode.

One embodiment of a computer display system 200 with manual fail-safe back-up according to the present invention is illustrated generally in FIGS. 2, 3 and 4. FIG. 2 illustrates computer display system in a normal mode of operation. FIG. 3 illustrates computer display system 200 in a fail-safe mode. FIG. 4 illustrates computer display system 200 in a stowed mode.

In the normal mode of operation of computer display system 200 illustrated in FIG. 2, a computer-driven display screen 202 and a corresponding computer system, such as computer system 106 illustrated in FIG. 1A, are functional. Computer-generated information from the corresponding functional computer system is displayed on computer-driven display screen 202.

In one embodiment, computer-driven flat panel display screen 202 is mounted to a backlight box 204. A transparent polycarbonate manual display screen 206 is mounted to the back light box 204. In one embodiment, a piano-type hinge 208 is employed to mount transparent polycarbonate manual display screen 206 to back light box 204. In one embodiment, a latch assembly 210 secures manual display screen 206 to back light box 204. A light source 212 having a back-up battery is mounted to backlight box 204.

In one embodiment, computer display system 200 is attached to a ceiling surface 216 using a piano-type hinge 214 mounted to an edge of light source 212. Computer display system 200 is secured in a vertical position with a latch assembly 218. A first latch mechanism 220a and a second latch mechanism 220b together form an open latch assembly 220. Latch assembly 220 is illustrated in its closed position as closed latch assembly 220 in FIG. 3. A first latch mechanism 224a and a second latch mechanism 224b together form an open latch assembly 224. Latch assembly 224 is illustrated in its closed position as closed latch assembly 224 in FIG. 3.

In the normal mode of operation of computer display system 200 illustrated in FIG. 2, a computer-driven flat panel display screen 202 and a corresponding computer system, such as computer system 106 illustrated in FIG. 1A, are functional. Computer-generated information from the corresponding functional computer system is displayed on computer-driven flat panel display screen 202.

In one embodiment, computer-driven flat panel display screen 202 and transparent polycarbonate manual display screen 206 are substantially perpendicular to the primary users' line of sight 228. In the normal mode of operation, computer driven information being displayed on computer-driven display screen 202 is viewable through manual display screen 206.

In the fail-safe mode of operation of computer display system 200 illustrated in FIG. 3, computer-driven flat panel display screen 202 and/or a corresponding computer system, such as computer system 106 illustrated in FIG. 1A, are not operational, and information provided by a human operator is manually displayed on transparent polycarbonate manual display screen 206.

Beginning from the normal mode configuration illustrated in FIG. 2, a latch assembly 210, illustrated in its closed position as closed latch assembly 210 in FIG. 2, is opened. Open latch assembly 210 is illustrated by a first latch mechanism 210a and second latch mechanism 210b. A latch assembly 218, illustrated in its closed position by latch assembly 218 in FIG. 2, is then opened. Open latch assembly 218 is illustrated by a first latch mechanism 218a and a second latch mechanism 218b. Computer-driven flat panel display screen 202, backlight box 204, and light source 212 are then rotated together approximately 90° in a clock-wise direction around piano-type hinge 214 and secured to a ceiling surface 216 by closed latch assembly 202. Closed latch assembly 220 is illustrated in its open position by a first latching mechanism 220a and a second latching mechanism 220b in FIG. 2.

Transparent polycarbonate manual display screen 206 rotates around a piano-type hinge 208 and remains in a vertical position. Transparent polycarbonate manual display screen 206 is secured in a substantially vertical position by a closed latching assembly 224. Closed latching assembly 224 is illustrated in its open position by latch mechanism 224a and latch mechanism 224b in FIG. 2. The upper edge of transparent polycarbonate manual display screen 206 is secured against light source 212, and transparent polycarbonate manual display screen 206 is evenly illuminated by light source 212.

In one embodiment, computer-driven flat panel display screen 202 is substantially parallel to and manual display screen 206 is substantially perpendicular to the primary users' line of sight 228. In one embodiment, a human operator, using grease pencils or other means, displays information on the rear 230 of transparent polycarbonate manual display screen 206.

In the stowed mode of computer display system 200 illustrated in FIG. 4, neither computer-driven flat panel display screen 202 nor transparent polycarbonate manual display screen 206 are being used, and no information is being displayed.

Beginning from the normal mode illustrated in FIG. 2, closed latch assembly 218 is opened. Open latch assembly 218 is illustrated by a first latch mechanism 218a and a second latch mechanism 218b. Computer-driven flat panel display screen 202, backlight box 204, manual display screen 206, and light source 212 are then rotated together approximately 90° in a clockwise direction around piano-type hinge 214 and secured to a the ceiling surface 216 by closed latch assembly 220. Closed latch assembly 220 is illustrated in its open position by latch mechanism 220a and latch mechanism 220b in FIG. 2. In one embodiment, computer display system 200 is substantially parallel to the primary users' line of sight 228, allowing decision center personnel and material to move freely on a floor surface 232 below.

Computer display system 200 provides fail-safe manual display of status information in case of computer system malfunction for mission critical operations. Moreover, the design of computer display system 200 minimizes equipment space requirements in decision centers.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer display system coupled to a computer system, the computer display system comprising:
    a computer-driven electronic display screen with a housing and displaying information provided from the computer system; and
    a transparent non-electric display board mounted to the computer-driven display screen housing and configured to display erasable information manually applied to a surface of the transparent non-electric display board by a human operator, wherein the information displayed on the computer-driven display screen is viewable from a line-of-sight in a first mode of operation, and the information displayed on the transparent non-electric display board is viewable from the line-of-sight in a second mode of operation.

2. The computer system of claim 1 wherein the computer-driven-electronic display system comprises a back-lit flat-panel display screen.

3. The display system of claim 1, wherein the transparent non-electric display board comprises transparent polycarbonate plastic.

4. The display system of claim 1, wherein the transparent non-electric display board is mounted to the front of the computer-driven electronic display screen housing.

5. The display system of claim 1, wherein the transparent non-electric display board includes an integral light source providing edge lighting to illuminate the transparent non-electric display board.

6. The display of claim 5, wherein the computer display system further comprises:
    a back-up power source capable of supplying power to the light source.

7. The display system of claim 1, wherein the transparent non-electric display board has a writeable rear surface.

8. The display system of claim 1, wherein the computer-driven electronic display screen is positionable to be in the line-of-sight during the first mode of operation and positionable to be out of the line of sight during the second mode of operation.

9. The display system of claim 1, wherein the computer-driven electronic display screen is hinge-mounted to an external supporting surface.

10. The display system of claim 1, wherein the transparent non-electric display board is hinge-mounted to the computer-driven electronic display screen housing.

11. The display system of claim 1, wherein the computer-driven electronic display screen and the transparent non-electric display board are rotatable to be substantially perpendicular to the line of sight in the first mode of operation, and the computer-driven electronic screen is rotatable to be substantially parallel with the line-of-sight and the transparent non-electric display board is rotatable to be substantially perpendicular to the line-of-sight in the second mode of operation.

12. The display system of claim 11, wherein and the computer-driven electronic display and the transparent non-electric display board are rotatable to be substantially parallel to the line of sight in a stowed mode.

13. The display system of claim 1, wherein the computer system and the computer-driven electronic display screen are operational in the first mode of, and the computer system and/or the computer-driven electronic display screen are not operational in the second mode of operation.

14. A method of displaying information, the method comprising:
    displaying information provided from a computer system on a computer-driven electronic display screen viewable from a line-of sight in a first mode of operation; and
    displaying erasable information manually applied by a human operator to a surface of a transparent non-electric display board viewable from the line-of sight in a second mode of operation.

15. The method of claim 14, wherein the step of displaying information provided by the human operator on the transparent non-electric display board is performed alternately to the step of displaying information from the computer system on the computer-driven electronic display screen.

16. The method of claim 14, further comprising:
    positioning the computer-driven electronic display screen to be in the line-of-sight during the first mode of operation; and
    positioning the computer-driven electronic display screen to be out of the line-of-sight during the second mode of operation.

17. The method of claim 14, further comprising:
    rotating the computer-driven electronic display screen and the transparent non-electric display board to be substantially perpendicular to the line-of-sight in the first mode of operation, and
    rotating the computer-driven electronic display board to be substantially parallel with the line-of-sight and rotating the transparent non-electric display board to be substantially perpendicular to the line-of-sight in the second mode of operation.

18. The method of claim 17, further comprising:
    rotating the computer-driven electronic display screen and the transparent non-electric display board to be substantially parallel with the line-of-sight in a stowed mode.

19. The computer display system of claim 1, wherein information is applied to the surface of the transparent non-electric display board with a grease pencil.

\* \* \* \* \*